United States Patent
Oi et al.

(10) Patent No.: US 11,933,900 B2
(45) Date of Patent: Mar. 19, 2024

(54) RECOGNITION DEVICE, VEHICLE SYSTEM, RECOGNITION METHOD, AND STORAGE MEDIUM

(71) Applicant: HONDA MOTOR CO., LTD., Tokyo (JP)

(72) Inventors: Akinori Oi, Wako (JP); Tatsuya Konishi, Wako (JP); Kenta Ishii, Wako (JP); Yuya Kaneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 17/678,059

(22) Filed: Feb. 23, 2022

(65) Prior Publication Data
US 2022/0308234 A1 Sep. 29, 2022

(30) Foreign Application Priority Data
Mar. 29, 2021 (JP) ................. 2021-055165

(51) Int. Cl.
*G01S 17/931* (2020.01)
*B60W 60/00* (2020.01)
(Continued)

(52) U.S. Cl.
CPC ......... *G01S 17/931* (2020.01); *B60W 60/001* (2020.02); *G01N 21/55* (2013.01);
(Continued)

(58) Field of Classification Search
CPC .... G01S 17/931; G01S 17/86; B60W 60/001; B60W 2420/403; B60W 2420/408;
(Continued)

(56) References Cited

U.S. PATENT DOCUMENTS 11,851,058 B2 * 12/2023 Rajvanshi ........... B60W 30/146
2021/0264169 A1 * 8/2021 Speigle ................ G06V 20/588
(Continued)

FOREIGN PATENT DOCUMENTS

JP 2019-158662 9/2019

*Primary Examiner* — Sze-Hon Kong
(74) *Attorney, Agent, or Firm* — Amin, Turocy & Watson, LLP

(57) ABSTRACT

A recognition device includes an acquisition unit configured to acquire a first detection result from a LIDAR that detects a target present in a traveling direction of a vehicle and to acquire a second detection result from a camera disposed so that the detection range overlaps that of the LIDAR, and a recognition unit configured to recognize a target present around the vehicle on the basis of the first detection result and the second detection result, in which the recognition unit executes exclusion processing of excluding a target, that satisfies all of a first condition indicating that a target is present within a predetermined distance from the vehicle, a second condition indicating that a target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

9 Claims, 8 Drawing Sheets

(51) Int. Cl.
  *G01N 21/55*  (2014.01)
  *G01N 27/12*  (2006.01)
  *G01S 17/86*  (2020.01)

(52) U.S. Cl.
  CPC .............. *G01N 27/12* (2013.01); *G01S 17/86* (2020.01); *B60W 2420/403* (2013.01); *B60W 2420/408* (2024.01); *B60W 2554/4041* (2020.02); *B60W 2555/20* (2020.02)

(58) Field of Classification Search
  CPC ..... B60W 2554/4041; B60W 2555/20; B60W 40/02; G01N 21/55; G01N 27/12
  See application file for complete search history.

(56) References Cited

U.S. PATENT DOCUMENTS

| | | | |
|---|---|---|---|
| 2022/0014674 A1* | 1/2022 | Ota | H04N 7/18 |
| 2022/0092876 A1* | 3/2022 | Shokonji | G06V 20/58 |
| 2023/0219532 A1* | 7/2023 | Fukumoto | B60S 1/54 |
| | | | 348/148 |
| 2023/0251846 A1* | 8/2023 | Satoh | G06T 7/70 |
| | | | 717/168 |
| 2023/0417873 A1* | 12/2023 | Kusumoto | G01S 17/66 |

\* cited by examiner

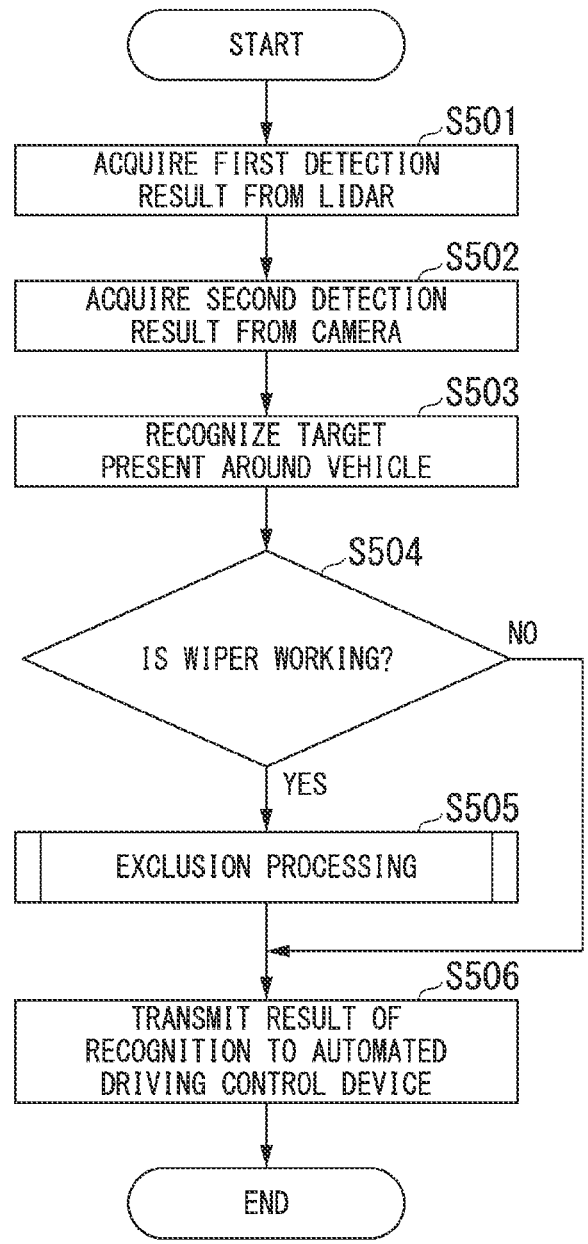

RECOGNITION DEVICE, VEHICLE SYSTEM, RECOGNITION METHOD, AND STORAGE MEDIUM

CROSS-REFERENCE TO RELATED APPLICATION

Priority is claimed on Japanese Patent Application No. 2021-055165, filed Mar. 29, 2021, the content of which is incorporated herein by reference.

BACKGROUND OF THE INVENTION

Field of the Invention

The present invention relates to a recognition device, a vehicle system, a recognition method, and a storage medium.

Description of Related Art

In recent years, research on automatic control of a vehicle has been conducted. In the automatic control of a vehicle, the position of an object in the vicinity of the vehicle is detected by using a light detection and ranging (LIDAR), a camera, or the like attached to the vehicle. However, if the vehicle travels during rainfall or when water has accumulated on the road surface, the water may roll up by the tires and a splash will occur. This splash can be erroneously recognized as a target that is present around the vehicle. Therefore, Japanese Unexamined Patent Application, First Publication No. 2019-158662 (hereinafter refer to Patent Document 1) discloses a technology for determining whether there is a splash on the basis of information such as an average brightness and an optical flow of an image taken by a camera.

SUMMARY OF THE INVENTION

However, since the technology disclosed in Patent Document 1 determines whether there is a splash by performing image processing on an image taken by a camera without using a result of detection by a LIDAR, for example, a splash caused by heavy rain hitting a windshield may be erroneously recognized as a target present around the vehicle in some cases.

Aspects of the present invention have been made in consideration of such circumstances, and an object thereof is to provide a recognition device, a vehicle system, a recognition method, and a storage medium that can improve the accuracy in splash determination.

The present invention has adopted the following aspects to solve the problems described above and achieve the object.

(1): A recognition device according to one aspect of the present invention includes an acquisition unit configured to acquire a first detection result from a LIDAR that detects a target present in a traveling direction of a vehicle and to acquire a second detection result from a camera disposed so that the detection range overlaps that of the LIDAR, and a recognition unit configured to recognize a target present around the vehicle on the basis of the first detection result and the second detection result, in which the recognition unit executes exclusion processing of excluding a target, that satisfies all of a first condition indicating that a target is present within a predetermined distance from the vehicle, a second condition indicating that a target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

(2): In the aspect of (1) described above, the acquisition unit may acquire a result of detecting a raindrop sensor mounted in the vehicle, and the recognition unit may execute the exclusion processing when rainfall is detected by the raindrop sensor, and may not execute the exclusion processing when rainfall is not detected by the raindrop sensor.

(3): In the aspect of (1) described above, the recognition unit may determine whether a road surface is wet on the basis of a result of detection by the camera, may execute the exclusion processing when it is determined that the road surface is wet, and may not execute the exclusion processing when it is determined that the road surface is not wet.

(4): In the aspect of (1) described above, the recognition unit may determine whether a wiper attached to a window of the vehicle is operating, may execute the exclusion processing when it is determined that the wiper is operating, and may not execute the exclusion processing when it is determined that the wiper is not operating.

(5): In the aspect of any one of (1) to (4) described above, when there is a target determined to be a two-wheeled vehicle on the basis of the second detection result within a predetermined range from a target detected on the basis of the first detection result, the recognition unit may not execute the exclusion processing on the target detected on the basis of the first detection result.

(6): In the aspect of any one of (1) to (5) described above, the recognition unit may exclude a target whose variation in distance from the vehicle within a predetermined time is equal to or greater than a predetermined value from the result of recognition in the exclusion processing.

(7): A vehicle system according to another aspect of the present invention includes the recognition device according to the aspect of any one of (1) to (6), and a control device configured to perform control of the vehicle on the basis of a result of recognition by the recognition device.

(8): A recognition method according to still another aspect of the present invention includes, by a computer, acquiring a first detection result from a LIDAR that detects a target present in a traveling direction of a vehicle, acquiring a second detection result from a camera disposed so that the detection range overlaps that of the LIDAR, recognizing a target present around the vehicle on the basis of the first detection result and the second detection result, and executing exclusion processing of excluding a target, which satisfies all of a first condition indicating that the target is present within a predetermined distance from the vehicle, a second condition indicating that the target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

(9): A computer-readable non-transitory storage medium stores a program causing a computer to execute acquiring a first detection result from a LIDAR that detects a target present in a traveling direction of a vehicle, acquiring a second detection result from a camera disposed so that the detection range overlaps that of the LIDAR, recognizing a target present around the vehicle on the basis of the first detection result and the second detection result, and executing exclusion processing of excluding a target, which satisfies all of a first condition indicating that the target is present within a predetermined distance from the vehicle, a second condition indicating that the target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

According to the aspects of (1) to (9), it is possible to improve the accuracy in splash determination.

BRIEF DESCRIPTION OF THE DRAWINGS

FIG. 8 is a flowchart which shows a flow of processing executed by a recognition device 16 according to a third embodiment.

DETAILED DESCRIPTION OF THE INVENTION

Hereinafter, embodiments of a recognition device, a vehicle system, a recognition method, and a storage medium of the present invention will be described with reference to the drawings.

First Embodiment

[Overall Configuration]

Figure 1:
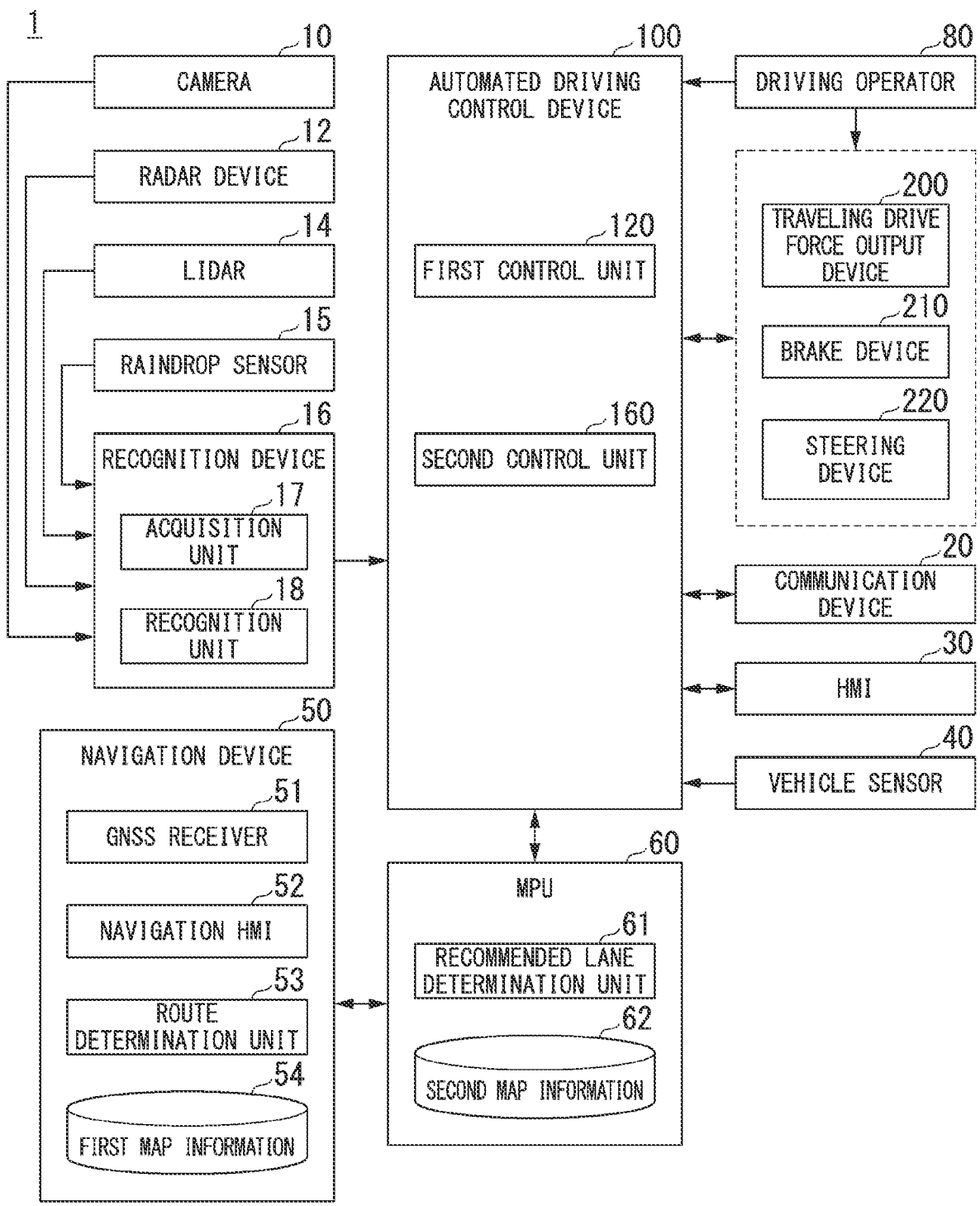
FIG. 1 is a configuration diagram of a vehicle system 1 using a vehicle control device according to a first embodiment.

FIG. 1 is a configuration diagram of a vehicle system 1 using a vehicle control device according to a first embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, LIDAR (light detection and ranging; LIDAR) 14, a raindrop sensor 15, a recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a vehicle M). When an image of the front is captured, the camera 10 is attached to an upper part of the front windshield, a back surface of the windshield rear-view mirror, and the like. The camera 10 periodically and repeatedly captures, for example, an image of a vicinity of the vehicle M. The camera 10 may be a stereo camera.

The radar device 12 radiates radio waves such as millimeter waves to the vicinity of the vehicle M, and detects the radio waves (reflected waves) reflected by an object to detect at least a position (a distance and a direction) of the object. The radar device 12 is attached to an arbitrary place on the vehicle M. The radar device 12 may detect the position and speed of the object by a frequency modulated continuous wave (FM-CW) method.

The LIDAR 14 emits light (or an electromagnetic wave having a wavelength close to that of light) to the vicinity of the vehicle M and measures scattered light. The LIDAR 14 detects a distance to a target on the basis of a time from light emission to light reception. The emitted light is, for example, a pulsed laser beam. The LIDAR 14 is attached to an arbitrary place of the vehicle M.

The raindrop sensor 15 is a sensor that detects rainfall. Specifically, the raindrop sensor 15 emits infrared rays to a windshield of the vehicle M, and detects the amount of rainfall according to a reflectance of the infrared rays. The raindrop sensor 15 is attached to the windshield of the vehicle M. The raindrop sensor 15 may detect the amount of rainfall by using another method. For example, the raindrop sensor 15 may detect the amount of rainfall according to a change in a resistance value when a raindrop adheres to an electrode.

The recognition device 16 performs sensor fusion processing on results of detection by some or all of the camera 10, the radar device 12, and the LIDAR 14, and recognizes the position, type, speed, and the like of the object. The recognition device 16 outputs a result of the recognition to the automated driving control device 100. The recognition device 16 may output the results of the detection by the camera 10, the radar device 12, and the LIDAR 14 to the automated driving control device 100 as they are. A function of the recognition device 16 may be incorporated into the automated driving control device 100, and the recognition device 16 may be omitted from the vehicle system 1.

The recognition device 16 includes an acquisition unit 17 and a recognition unit 18. The acquisition unit 17 and the recognition unit 18 are each realized by, for example, a hardware processor such as a central processing unit (CPU) executing a program (software). Some or all of these components may be realized by hardware (circuit units; including circuitry) such as large scale integration (LSI), an application specific integrated circuit (ASIC), a field-programmable gate array (FPGA), a graphics processing unit (GPU), and may also be realized by software and hardware in cooperation. The program may be stored in advance in a storage device (a storage device having a non-transient storage medium) such as a hard disk drive (HDD) or a flash memory of the recognition device 16, or may be stored in a detachable storage medium such as a DVD or a CD-ROM and installed in the HDD or the flash memory of the recognition device 16 by the storage medium (non-transient storage medium) being attached to a drive device.

The communication device 20 communicates with other vehicles present in the vicinity of the vehicle M by using, for example, a cellular network, a Wi-Fi network, Bluetooth (registered trademark), dedicated short range communication (DSRC), or the like, or communicates with various server devices via a radio base station.

The HMI 30 presents various types of information to an occupant of the vehicle M and receives an input operation by the occupant. The HMI 30 includes various display devices, speakers, buzzers, touch panels, switches, keys, and the like.

The vehicle sensor 40 includes a vehicle speed sensor that detects a speed of the vehicle M, an acceleration sensor that detects an acceleration, a yaw rate sensor that detects an angular speed around the vertical axis, an azimuth sensor that detects a direction of the vehicle M, and the like The navigation device 50 includes, for example, a global navigation satellite system (GNSS) receiver 51, a navigation HMI 52, and a rout determination unit 53. The navigation device 50 holds first map information 54 in a storage device such as an HDD or a flash memory. The GNSS receiver 51 identifies the position of the vehicle M on the basis of a signal received from a GNSS satellite. The position of the vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determination unit 53 determines, for example, a route from the position of the vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. A route on a map is output to the MPU 60. The navigation device 50 may perform route guidance using the navigation HMI 52 on the basis of the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determination unit 61, and holds second map information 62 in a storage device such as an HDD or a flash memory. The recommended lane determination unit 61 divides the route on a map provided from the navigation device 50 into a plurality of blocks (for example, divides every 100 [m] in a vehicle traveling direction), and determines a recommended lane for each block with reference to the second map information 62. The recommended lane determination unit 61 determines which numbered lane from the left to drive. When a branch place is present on the route on a map, the recommended lane determination unit 61 determines a recommended lane so that the vehicle M can travel on a reasonable route to proceed to the branch destination.

The second map information 62 is map information with higher accuracy than the first map information 54. The second map information 62 includes, for example, information on a center of a lane, information on a boundary of the lane, and the like. The second map information 62 may include road information, traffic regulation information, address information (addresses/zip codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, odd-shaped steering, a joystick, and other operators. The driving operator 80 is attached to a sensor that detects the amount of operation or a presence or absence of an operation, and a result of detection is output to the automated driving control device 100, or some or all of the traveling drive force output device 200, the brake device 210, and the steering device 220.

The automated driving control device 100 includes, for example, a first control unit 120 and a second control unit 160. The first control unit 120 and the second control unit 160 are realized by, for example, a hardware processor such as a CPU executing a program (software), respectively. Some or all of these components may be realized by hardware (a circuit unit; including circuitry) such as LSI, an ASIC, an FPGA, or a GPU, or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to the drive device. The automated driving control device 100 is an example of the "vehicle control device," and a combination of the action plan generation unit 140 and the second control unit 160 is an example of a "driving control unit."

Figure 2:
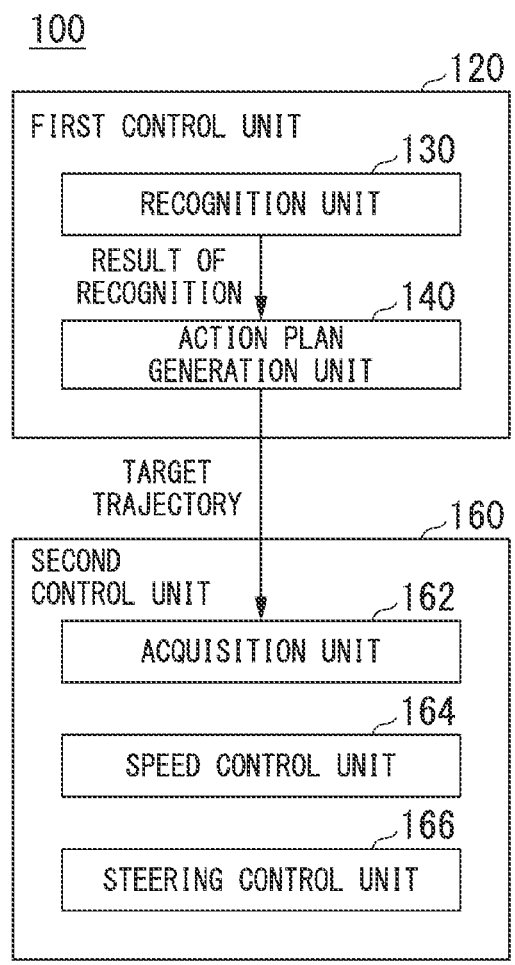
FIG. 2 is a functional configuration diagram of a first control unit 120 and a second control unit 160.

FIG. 2 is a functional configuration diagram of the first control unit 120 and the second control unit 160. The first control unit 120 includes, for example, a recognition unit 130 and an action plan generation unit 140. The first control unit 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating the both recognition. As a result, reliability of automated driving is ensured.

The recognition unit 130 recognizes the position of an object in the vicinity of the vehicle M and states such as a speed and acceleration thereof on the basis of information input from the camera 10, the radar device 12, and the LIDAR 14 via the object recognition device 16. The position of an object is recognized as, for example, a position on absolute coordinates with a representative point (a center of gravity, a center of a drive axis, or the like) of the vehicle M as an origin, and is used for control. The position of an object may be represented by a representative point such as the center of gravity or a corner of the object, or may be represented by an expressed area. The "states" of an object may include the acceleration or jerk of the object, or a "behavioral state" (for example, whether a lane is being changed or is about to be changed).

The recognition unit 130 recognizes, for example, a lane (a traveling lane) in which the vehicle M is traveling. For example, the recognition unit 130 recognizes a traveling lane by comparing a pattern of road lane marking (for example, an array of solid lines and broken lines) obtained from the second map information 62 with a pattern of road lane marking in the vicinity of the vehicle M recognized from an image captured by the camera 10. The recognition unit 130 may also recognize a traveling lane by recognizing not only the road lane marking but also road boundaries including the road lane marking, a road shoulder, a curb, a median strip, a guardrail, and the like. In this recognition, the position of the vehicle M acquired from the navigation device 50 and a result of processing by the INS may be added. The recognition unit 130 recognizes stop lines, obstacles, red lights, tollhouses, and other road events.

The recognition unit 130 recognizes a position and a posture of the vehicle M with respect to a traveling lane when the traveling lane is recognized. The recognition unit 130 recognizes, for example, a deviation of a reference point of the vehicle M from a center of a lane and an angle of the vehicle M formed by a line connecting the center of the lane in a traveling direction thereof as a relative position and a posture of the vehicle M with respect to the traveling lane. Instead, the recognition unit 130 may recognize a position of the reference point of the vehicle M with respect to any side end (a road lane marking or a road boundary) of the traveling lane as the relative position of the vehicle M with respect to the traveling lane.

In principle, the action plan generation unit 140 travels in a recommended lane determined by the recommended lane determination unit 61, and, furthermore, generates a target trajectory on which the vehicle M will travel automatically (regardless of an operation of a driver) in the future to be able to respond to surrounding conditions of the vehicle M. The target trajectory includes, for example, a speed element. For example, the target trajectory is expressed as a sequence of points (trajectory points) to be reached by the vehicle M. The trajectory point is a point to be reached by the vehicle M for each predetermined traveling distance (for example, about several [m]) along a road, and, separately, a target speed and a target acceleration for each predetermined sampling time (for example, about decimal point number [sec]) are generated as a part of the target trajectory. The trajectory point may be a position to be reached by the vehicle M at a corresponding sampling time for each predetermined sampling time. In this case, information on the target speed and target acceleration is expressed by an interval between trajectory points.

The action plan generation unit 140 may set an event of automated driving when a target trajectory is generated. The event of automated driving includes a constant-speed traveling event, a low-speed following traveling event, a lane change event, a branching event, a merging event, and a takeover event. The action plan generation unit 140 generates a target trajectory according to an event to be started.

The second control unit 160 controls the traveling drive force output device 200, the brake device 210, and the steering device 220 so that the vehicle M passes through a target trajectory generated by the action plan generation unit 140 at a scheduled time.

The second control unit 160 includes, for example, an acquisition unit 162, a speed control unit 164, and a steering control unit 166. The acquisition unit 162 acquires information on a target trajectory (trajectory points) generated by the action plan generation unit 140 and stores it in a memory (not shown). The speed control unit 164 controls the traveling drive force output device 200 or the brake device 210 on the basis of a speed element associated with the target trajectory stored in the memory. The steering control unit 166 controls the steering device 220 according to a degree of bending of the target trajectory stored in the memory. Processing of the speed control unit 164 and the steering control unit 166 is realized by, for example, a combination of feedforward control and feedback control. As an example, the steering control unit 166 executes the combination of feedforward control according to a curvature of a road in front of the vehicle M and feedback control based on a deviation from the target trajectory.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU controls the configuration described above according to information input from the second control unit 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second control unit 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second control unit 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second control unit 160 or the information input from the driving operator 80, and changes the direction of the steering wheel.

[Splash Determination]

Figure 3:
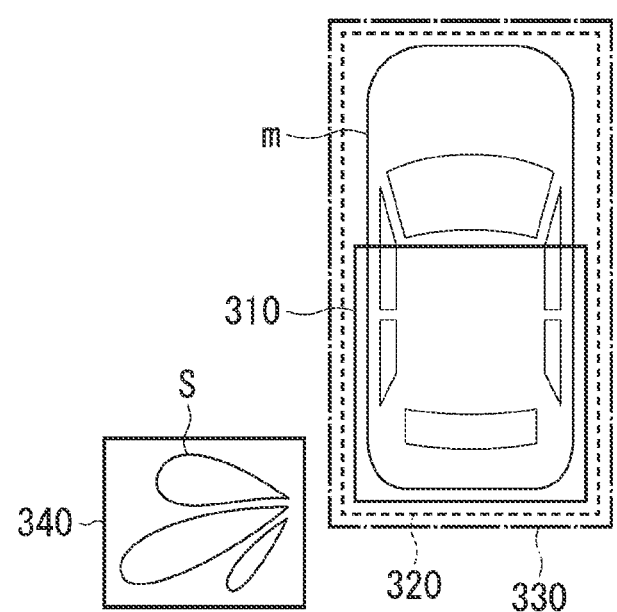
FIG. 3 is a diagram which shows a state in which a splash S has occurred in front of a vehicle M.

FIG. 3 is a diagram which shows a state in which a splash S has occurred in front of the vehicle M. In FIG. 3, a vehicle m is traveling in front of the vehicle M, and the splash S rolling up from tires of the vehicle M occurs. A target frame 310 is a frame indicating a range detected by the camera 10 as a target. A target frame 320 is a frame indicating a range detected by the LIDAR 14 as a target. A target frame 330 is a frame indicating a range detected as a target by the recognition device 16 performing sensor fusion processing. In this manner, the recognition device 16 recognizes the vehicle m as a target.

On the other hand, a target frame 340 is a frame indicating a range detected by the LIDAR 14 as a target. The target frame 340 includes the splash S. When the splash S occurs from the vehicle m, the target frame 340 detected by the LIDAR 14 appears in front of the vehicle M. When the LIDAR 14 detects a plurality of splashes having occurred from the vehicle m, it detects one splash S including these by performing clustering processing on these splashes. A width of the target frame 340 including the splash S is about 0.7 [m], and it moves at a speed equivalent to that of a vehicle.

When the recognition device 16 recognizes that a splash S is a target, the automated driving control device 100 controls the brake device 210 such that the vehicle M decelerates, and performs control to avoid the splash S. To prevent such erroneous braking, eliminating a small target from a result of the recognition may be considered. However, in this case, it may not be possible to recognize a two-wheeled vehicle such as a bike present in a vicinity of the vehicle m. For this reason, the recognition device 16 needs to accurately determine whether a detected target is the splash S.

Therefore, the recognition device 16 determines that a target satisfying the following (first condition) to (third condition) is the splash S, and excludes the target from a result of recognition recognized as a target present around the vehicle M. (First condition) A target is present within a predetermined distance from the vehicle M.

(Second condition) A target is detected by the LIDAR 14, and is not detected by the camera 10.

(Third condition) A width of a target frame is equal to or less than a predetermined value, and a detection duration thereof is equal to or less than a predetermined time.

That is, although the LIDAR 14 can detect a plurality of targets, information of the target satisfying the (first condition) to (third condition) is not used for controlling the vehicle M by the automated driving control device 100. As a result, it is possible to prevent control of avoiding a splash S after the splash S is erroneously recognized as a target from being performed.

However, there is a problem that a processing load of the recognition device 16 is large when a splash determination for determining whether a corresponding target is a splash S is performed on all the recognized targets. For this reason, the recognition unit 18 of the recognition device 16 may not perform the splash determination on a target whose distance from the vehicle M is a predetermined distance (for example, 20 [m]) or more. As a result, the processing load of the recognition device 16 can be reduced.

[Flowchart of Recognition Device]

Figure 4:
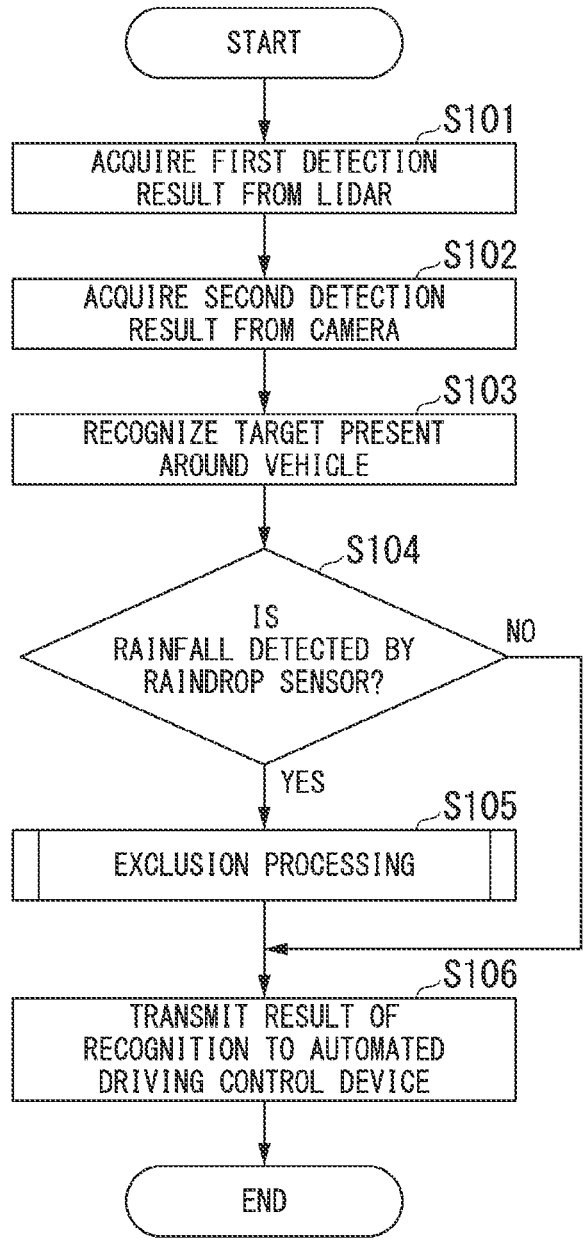
FIG. 4 is a flowchart which shows a flow of processing executed by a recognition device 16 according to the first embodiment.

FIG. 4 is a flowchart which shows a flow of processing executed by the recognition device 16 according to the first embodiment. First, the acquisition unit 17 of the recognition device 16 acquires a first detection result from the LIDAR 14 that detects a target present in the traveling direction of the vehicle M (S101). Next, the acquisition unit 17 acquires a second detection result from the camera 10 disposed so that the detection range overlaps that of the LIDAR 14 (S102).

Next, the recognition unit 18 of the recognition device 16 recognizes a target present around the vehicle M on the basis of the first detection result and the second detection result (S103). For example, as shown in FIG. 3, the recognition unit 18 recognizes the vehicle m traveling in front of the vehicle M and the splash S wound up from the tires of the vehicle m as a target.

Next, the recognition unit 18 determines whether rainfall has been detected by the raindrop sensor 15 (S104). When it is determined that rainfall is detected by the raindrop sensor 15 (YES in S104), exclusion processing to be described below is executed (S105). The exclusion processing is processing of determining whether the detected target is a splash S, and excluding a target determined to be a splash S from a result of recognition recognized as a target present around the vehicle M.

When the exclusion processing in S105 is completed, the recognition unit 18 transmits a result of recognition to the automated driving control device 100 (S106), and ends processing of this flowchart. On the other hand, when it is determined that rainfall has not been detected by the raindrop sensor 15 (NO in S104), the recognition unit 18 proceeds to processing of S106 without executing the exclusion processing of S105.

In this manner, the recognition unit 18 performs the exclusion processing only when rainfall is detected by the raindrop sensor 15. As a result, since the exclusion processing is not performed except at a time of rainfall, the processing load of the recognition device 16 can be reduced.

Figure 5:
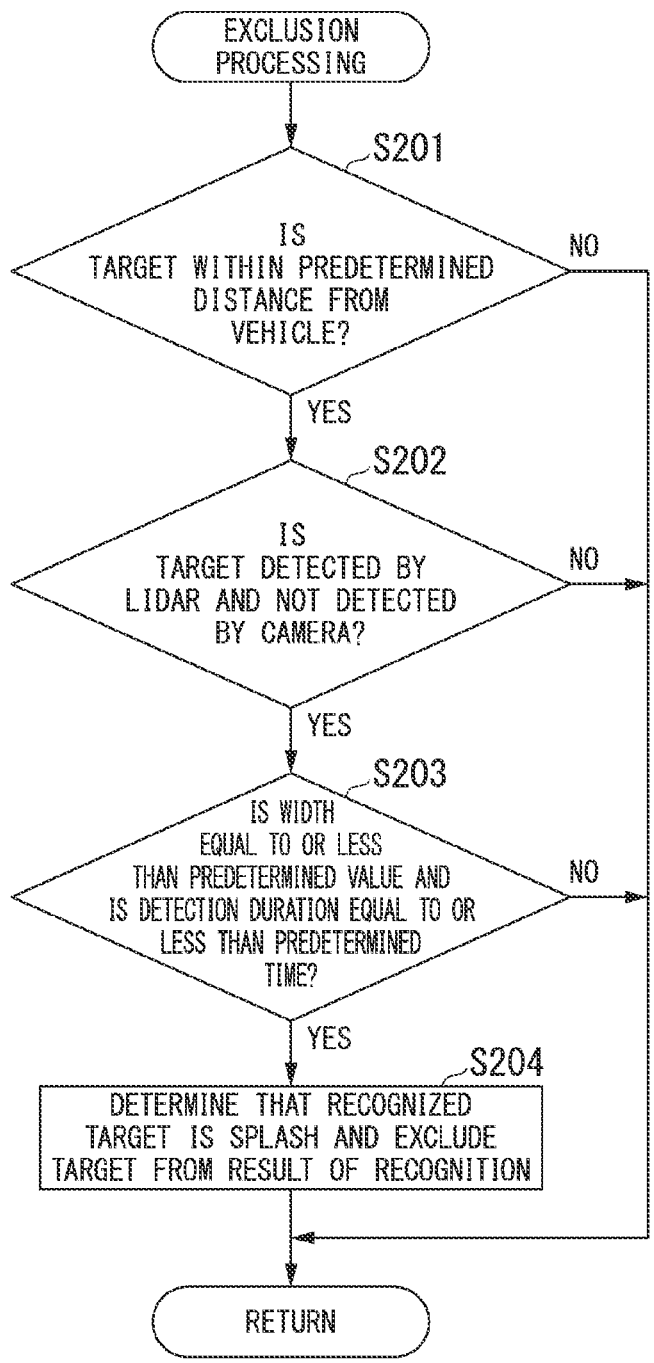
FIG. 5 is a flowchart which shows a flow of exclusion processing shown in S105 of FIG. 4.

FIG. 5 is a flowchart which shows a flow of the exclusion processing shown in S105 of FIG. 4. In the exclusion processing, the recognition unit 18 determines that a target satisfying the (first condition) to (third condition) described above is a splash S, and excludes this target from the result of recognition. In the following description, the exclusion processing will be described in detail.

First, the recognition unit 18 determines whether a recognized target satisfies (the first condition) (S201). That is, the recognition unit 18 determines whether the recognized target is within a predetermined distance from the vehicle M. For example, the recognition unit 18 may calculate a distance from the vehicle M to the target on the basis of a result of detection by the LIDAR 14, and determine whether the calculated distance is within a predetermined distance (for example, 1 [m]). When it is determined that the recognized target does not satisfy (the first condition) (NO in S201), the recognition unit 18 determines that the recognized target is not a splash S, and proceeds to the processing of S106 in FIG. 4.

On the other hand, when it is determined that the recognized target satisfies (the first condition) (YES in S201), the recognition unit 18 determines whether the recognized target satisfies (the second condition) (S202). That is, the recognition unit 18 determines whether the recognized target is detected by the LIDAR 14 and is not detected by the camera 10. When it is determined that the recognized target does not satisfy (the second condition) (NO in S202), the recognition unit 18 determines that the recognized target is not a splash S, and proceeds to the processing of S106 in FIG. 4.

On the other hand, when it is determined that the recognized target satisfies (the second condition) (YES in S202), the recognition unit 18 determines whether the recognized target satisfies (the third condition) (S203). That is, the recognition unit 18 determines whether a width of the recognized target is equal to or less than a predetermined value and a detection duration of the recognized target is equal to or less than a predetermined time. For example, the recognition unit 18 may calculate a width of a target on the basis of a width of a target frame detected by the LIDAR 14, and determine whether the calculated width of the target is equal to or less than a predetermined value (for example, 1 [m]). The recognition unit 18 calculates the detection duration on the basis of the number of frames in which the target appears, and determines whether the calculated detection duration is equal to or less than a predetermined time (for example, 0.3 [seconds]). When it is determined that the recognized target does not satisfy (the third condition) (NO in S203), the recognition unit 18 determines that the recognized target is not a splash S, and proceeds to the processing of S106 in FIG. 4.

On the other hand, when it is determined that the recognized target satisfies (the third condition) (YES in S203), the recognition unit 18 determines that the recognized target is a splash S, excludes this target from the result of recognition recognized as a target present around the vehicle M (S204), and proceeds to the processing of S106 in FIG. 4.

[Flowchart of Automated Driving Control Device]

Figure 6:
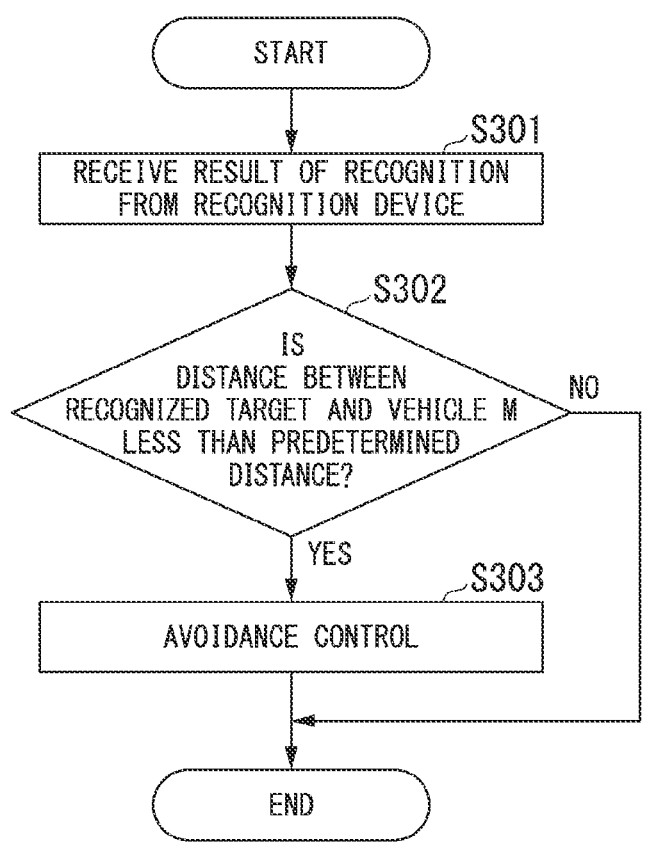
FIG. 6 is a flowchart which shows a flow of processing executed by an automated driving control device 100.

FIG. 6 is a flowchart which shows a flow of processing executed by the automated driving control device 100. First, the automated driving control device 100 receives a result of recognition transmitted from the recognition device 16 in S106 of FIG. 4 (S301).

Next, the automated driving control device 100 determines whether a distance between the recognized target and the vehicle M is less than a predetermined distance based on the received result of recognition (S302). When the distance between the recognized target and the vehicle M is less than a predetermined distance (YES in S302), the automated driving control device 100 performs avoidance control for avoiding this target (S303), and ends processing of this flowchart. The avoidance control is, for example, control of controlling the brake device 210 and the steering device 220 to prevent the vehicle M from coming into contact with the target.

On the other hand, when the distance between the recognized target and the vehicle M is equal to or greater than a predetermined distance (NO in S302), the automated driving control device 100 ends the processing of this flowchart without performing the avoidance control of S303.

As described above, since the recognition device 16 of the present embodiment determines whether the recognized target is a splash S on the basis of (the first condition) to (the third condition), a determination accuracy of a splash S can be improved. The recognition device 16 of the present embodiment excludes a target determined to be a splash S from the result of recognition recognized as a target present around the vehicle M, and thereby it is possible to prevent the automated driving control device 100 from performing avoidance control of avoiding the splash S.

Since a width of a two-wheeled vehicle such as a bike is narrow, there is a possibility that it will be erroneously detected as a splash S in relation to (the third condition). When it is erroneously detected as a splash S, the exclusion processing described above is performed on the two-wheeled vehicle, so that the two-wheeled vehicle may not be recognized as a target. To prevent this, when there is a target determined to be a two-wheeled vehicle on the basis of the second detection result (a result of detection by the camera 10) within a predetermined range from a target detected on the basis of the first detection result (a result of detection by the LIDAR 14), the recognition unit 18 may not execute the exclusion processing on the target detected on the basis of the first detection result. As a result, it possible to prevent the two-wheeled vehicle from not being recognized as a target.

The splash S may move back and forth with respect to the vehicle M. To detect such a splash S with high accuracy, the recognition unit 18 may determine that the target whose variation in distance from the vehicle M within a predetermined time is equal to or greater than a predetermined value is the splash S in the exclusion processing described above, and exclude the target from the result of recognition. As a result, the detection accuracy of the splash S can be further improved.

Second Embodiment

In the first embodiment, the recognition unit 18 executes exclusion processing when rainfall is detected by the raindrop sensor 15, and does not execute the exclusion processing when rainfall is not detected by the raindrop sensor 15. On the other hand, in the second embodiment, the recognition unit 18 determines whether to execute the exclusion processing based on an image of a road surface taken by the camera 10 instead of using the raindrop sensor 15. In the following description, details of the second embodiment will be described.

[Flowchart of Recognition Device]

Figure 7:
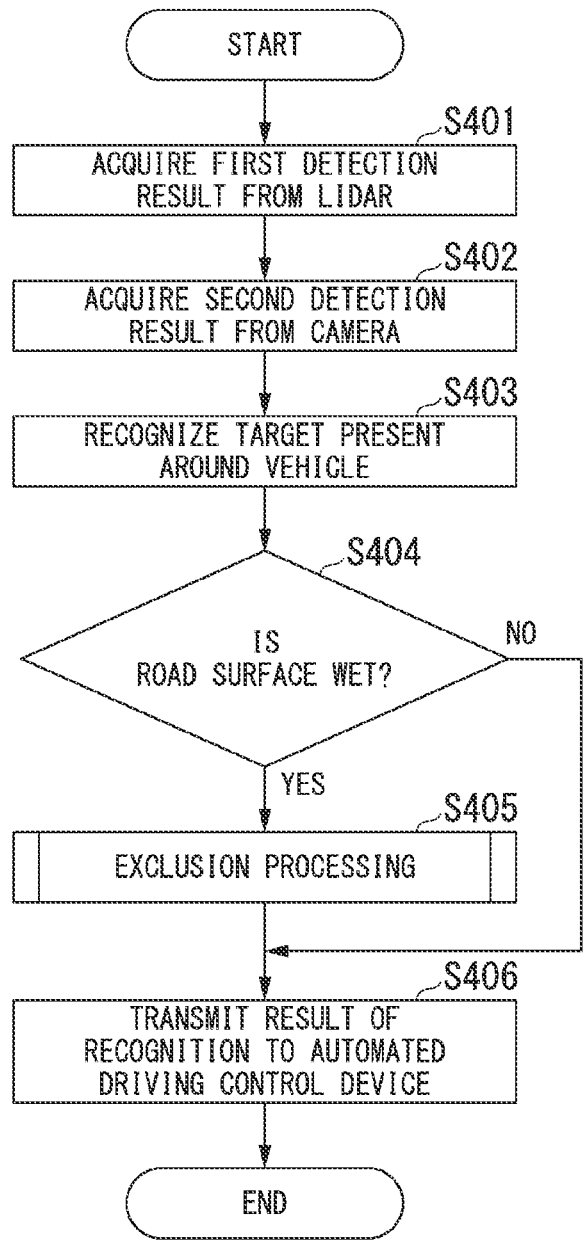
FIG. 7 is a flowchart which shows a flow of processing executed by a recognition device 16 according to a second embodiment.

FIG. 7 is a flowchart which shows a flow of processing executed by the recognition device 16 according to the second embodiment. Since processing of S401 to S403 in FIG. 7 is the same as the processing of S101 to S103 in FIG. 4, the description thereof will be omitted.

After the processing of S403 is completed, the recognition unit 18 of the recognition device 16 determines whether a road surface is wet from the image of the road surface taken by the camera 10 included in the second detection result (S404). For example, the recognition unit 18 may determine whether the road surface is wet by using a learned model learned (supervised learned) using teacher data. The teacher data includes learning data and correct answer data. The learning data is an image of the road surface. The correct answer data is a value indicating whether the road surface is wet. As a result, the learned model outputs a value indicating whether the road surface is wet when the image of the road surface taken by the camera 10 is input.

The recognition unit 18 has determined whether the road surface is wet by using the learned model, but the present invention is not limited to this. For example, the recognition unit 18 may determine whether the road surface is wet on the basis of a color of the road surface and a reflectance of light from the road surface.

When it is determined that the road surface is wet (YES in S404), the recognition unit 18 executes the exclusion processing of S405. On the other hand, when it is determined that the road surface is not wet (NO in S404), the recognition unit 18 proceeds to the processing of S406 without executing the exclusion processing of S405. Since the processing of S405 and S406 is the same as the processing of S105 and S106 in FIG. 4, the description thereof will be omitted.

In this manner, the recognition unit 18 performs the exclusion processing only when it is determined that the road surface is wet. As a result, the exclusion processing is not performed when the road surface is not wet, so that a processing load of the recognition device 16 can be reduced.

Third Embodiment

In the first embodiment, the recognition unit 18 executes the exclusion processing when rainfall is detected by the raindrop sensor 15, and does not execute the exclusion processing when rainfall is not detected by the raindrop sensor 15. In the second embodiment, recognition unit 18 executes the exclusion processing when it is determined that the road surface is wet, and does not execute the exclusion processing when it is determined that the road surface is not wet. On the other hand, in a third embodiment, the recognition unit 18 determines whether to execute the exclusion processing depending on whether a wiper attached to a window of the vehicle M is operating. In the following description, details of the third embodiment will be described.

[Flowchart of Recognition Device]

FIG. 8 is a flowchart which shows a flow of processing executed by the recognition device 16 according to the third embodiment. Since processing of S501 to S503 in FIG. 8 is the same as the processing of S101 to S103 in FIG. 4, the description thereof will be omitted.

After the processing of S503 is completed, the recognition unit 18 of the recognition device 16 determines whether the wiper attached to the window of the vehicle M is operating (S504). For example, the recognition unit 18 may receive operation information indicating whether the wiper is operating from the automated driving control device 100, and may determine whether the wiper is operating on the basis of this operation information.

The recognition unit 18 has determined whether the wiper is operating on the basis of the operation information received from the automated driving control device 100, but the present invention is not limited to this. For example, the recognition unit 18 may determine whether the wiper is operating by using a sensor for physically detecting that the wiper is operating.

When it is determined that the wiper is operating (YES in S504), the recognition unit 18 executes the exclusion processing of S505. On the other hand, when it is determined that the wiper is not operating (NO in S504), the recognition unit 18 proceeds to the processing of S506 without executing the exclusion processing of S505. Since the processing of S505 and S506 is the same as the processing of S105 and S106 in FIG. 4, the description thereof will be omitted.

In this manner, the recognition unit 18 performs the exclusion processing only when it is determined that the wiper is operating. As a result, the exclusion processing is not performed when the wiper is not operating, so that a processing load of the recognition device 16 can be reduced.

According to the first to third embodiments described above, the recognition device 16 executes the exclusion processing of excluding a target, which satisfies all of the first condition indicating that a target is present within a predetermined distance from the vehicle M, the second condition indicating that a target is detected by the LIDAR 14 and is not detected by the camera 10, and the third condition indicating that a width of a target is equal to or less than a predetermined value and a detection duration thereof is equal to or less than a predetermined time, from a result of recognition recognized as a target present around the vehicle M. As a result, the accuracy in determination of a splash S can be improved.

The embodiment described above can be expressed as follows.

A recognition device includes a storage device that has stored a program, and a hardware processor, in which the hardware processor executes the program stored in the storage device, thereby acquiring a first detection result from a LIDAR that detects a target present in a traveling direction of a vehicle, acquiring a second detection result from a camera disposed so that the detection range overlaps that of the LIDAR, recognizing a target present around the vehicle on the basis of the first detection result and the second detection result, and executing exclusion processing of excluding a target, which satisfies all of a first condition indicating that the target is present within a predetermined distance from the vehicle, a second condition indicating that the target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

Although a mode for carrying out the present invention has been described above using the embodiments, the present invention is not limited to the embodiments, and various modifications and substitutions can be made within a range not departing from the gist of the present invention.

What is claimed is:
1. A recognition device comprising:
an acquisition unit configured to acquire a first detection result from a LIDAR that detects a target present in a traveling direction of a vehicle and to acquire a second detection result from a camera disposed so that the detection range overlaps that of the LIDAR; and
a recognition unit configured to recognize a target present around the vehicle on the basis of the first detection result and the second detection result,
wherein the recognition unit executes exclusion processing of excluding a target, that satisfies all of a first condition indicating that a target is present within a predetermined distance from the vehicle, a second condition indicating that a target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

2. The recognition device according to claim 1,
wherein the acquisition unit acquires a result of detecting a raindrop sensor mounted in the vehicle, and
the recognition unit executes the exclusion processing when rainfall is detected by the raindrop sensor, and does not execute the exclusion processing when rainfall is not detected by the raindrop sensor.

3. The recognition device according to claim 1,
wherein the recognition unit determines whether a road surface is wet on the basis of a result of detection by the camera, executes the exclusion processing when it is determined that the road surface is wet, and does not execute the exclusion processing when it is determined that the road surface is not wet.

4. The recognition device according to claim 1,
wherein the recognition unit determines whether a wiper attached to a window of the vehicle is operating, executes the exclusion processing when it is determined that the wiper is operating, and does not execute the exclusion processing when it is determined that the wiper is not operating.

5. The recognition device according to claim 1,
wherein, when there is a target determined to be a two-wheeled vehicle on the basis of the second detection result within a predetermined range from a target detected on the basis of the first detection result, the recognition unit does not execute the exclusion processing on the target detected on the basis of the first detection result.

6. The recognition device according to claim 1,
wherein the recognition unit excludes a target whose variation in distance from the vehicle within a predetermined time is equal to or greater than a predetermined value from the result of recognition in the exclusion processing.

7. A vehicle system comprising:
the recognition device according to claim 1, and
a control device configured to perform control of the vehicle on the basis of a result of recognition by the recognition device.

8. A recognition method comprising:
by a computer, acquiring a first detection result from a LIDAR that detects a target present in a traveling direction of a vehicle;

acquiring a second detection result from a camera disposed so that the detection range overlaps that of the LIDAR;

recognizing a target present around the vehicle on the basis of the first detection result and the second detection result; and executing exclusion processing of excluding a target, which satisfies all of a first condition indicating that the target is present within a predetermined distance from the vehicle, a second condition indicating that the target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

9. A computer-readable non-transitory storage medium that stores a program causing a computer to execute acquiring a first detection result from a LIDAR that detects a target present in a traveling direction of a vehicle;

acquiring a second detection result from a camera disposed so that the detection range overlaps that of the LIDAR;

recognizing a target present around the vehicle on the basis of the first detection result and the second detection result; and executing exclusion processing of excluding a target, which satisfies all of a first condition indicating that the target is present within a predetermined distance from the vehicle, a second condition indicating that the target is detected by the LIDAR and is not detected by the camera, and a third condition indicating that a width of a target is equal to or less than a predetermined value and a detection duration thereof is equal to or less than a predetermined time, from a result of recognition recognized as a target present around the vehicle.

* * * * *